United States Patent Office 2,990,218
Patented June 27, 1961

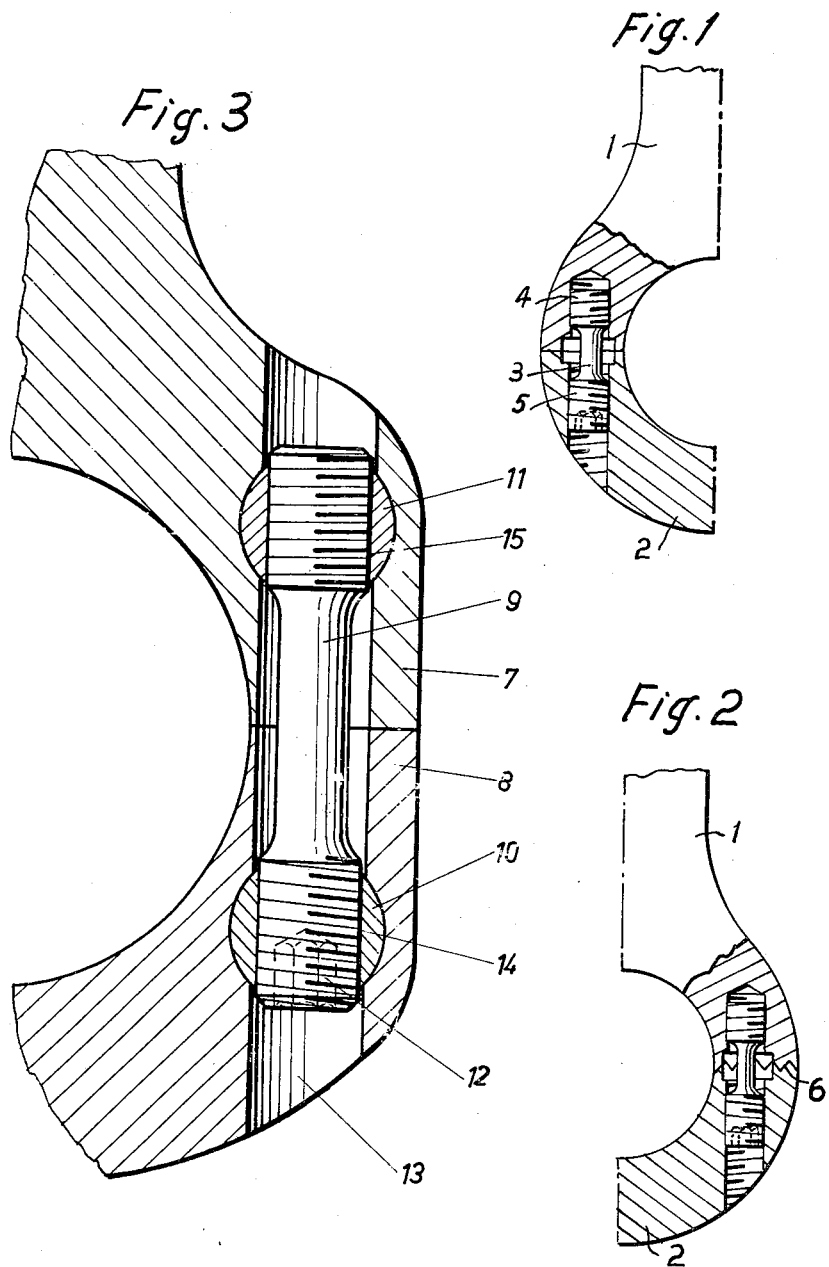

2,990,218
TWO PART BEARING ASSEMBLIES

Ernst Schlechtendahl, Sigmaringendorf, Sturren, Germany, assignor to Fuerstlich Hohenzollernsche Huettenverwaltung, Laucherthal, Germany, a company of Germany
Filed Feb. 19, 1958, Ser. No. 716,219
Claims priority, application Germany Feb. 21, 1957
6 Claims. (Cl. 308—74)

This invention relates to two part bearings, particularly connecting rod bearings, of the kind formed by two parts which are held together surrounding a journal by screw threaded members.

Two-part bearings are conventionally joined by means of two or more nuts and bolts or by headed set-screws. With bolts, the assembly pressure is obtained by the head of the bolt and the nut pressing on associated pressure faces arranged at right-angles to the axis of the bolt. The head of the set-screw likewise presses on such a pressure face, generally on the bearing covers, whilst its screw-thread engages the other bearing part.

Undesirable stress concentrations are set up at the place where the pressure face for the head of the set-screw or bolt or for the nut merges into the actual bearing member and these should be avoided wherever possible.

Stress concentrations are reduced to some extent in practice by providing large radii and fillets, or alternatively, the danger of stress concentrations is diminished by increasing the fatigue strength of the material from which the bearing parts are made by polishing or pressing the points where they are likely to occur. Such procedures are costly and, in addition, the need for pressure faces for the heads of the screws or bolts or for the nuts makes it impossible to construct split bearing members, particularly split connecting rods, which have the advantages of a one-piece connecting rod for example. One-piece connecting rods, however, can only be used in conjunction with composite crankshafts which in general involves additional costs. Such advantageous shaping is particularly important for dynamically highly stressed bearings when, to promote emergency running properties or even good sliding properties, the constructional member is made of a material such as aluminium which has a relatively low strength. This is, for example, the case with aluminium connecting rods, the big end of which is provided with only a relatively thin bearing layer or perhaps even none at all.

The invention relates to a screw-thread connection which permits a split bearing to be made in a shape which substantially simulates the advantageous shaping of a one-piece bearing, and wherein set screw heads or bolt heads and nuts are avoided and pressure faces for them are thus dispensed with.

According to the invention the aligned holes in both halves of the bearing are screw-threaded and the connection is made by means of studs.

In one construction of the invention each half of the bearing is made from light metal and each half is provided at right-angles to each stud hole with a transverse bolt, preferably made of high tensile steel, each bolt being provided with a screw-threaded transverse hole for receiving the studs. The screw-thread for the studs is therefore no longer located within the light metal but in bolts made of high tensile metal. The forces set up by the screw-thread connection are transmitted to the bearing halves through the rounded and preferably cylindrical bolts without setting up dangerous stress concentrations.

Some examples in accordance with the invention will now be described with reference to the accompanying drawings in which:

FIGURES 1 and 2 each show one-half of a section through the end of a connecting rod and, FIGURE 3 shows to a larger scale a section through one-half of the end of a connecting rod.

In the connecting rod shown in FIGURE 1, cover or cap 2 is connected to the connecting rod body 1 by means of studs 3 and for this purpose, aligned holes in both bearing halves are screw-threaded. Each stud has a right-hand thread 4 and a left-hand thread 5, so that complementary tightening can be effected between the connecting rod and the cover when the stud is tightened. This is done by inserting a key or the like through a hole in the cover into a shaped recess in the end of the stud.

As an alternative both of the threads 4 and 5 can be of the same hand, the thread 5, however, having a smaller pitch than the thread 4. In this case tightening likewise takes place by turning the stud 3 to the right and loosening by turning it to the left.

Alignment between the cap and the connecting rod body can be effected directly by means of the studs 3. However, if such centering is not sufficiently accurate other means may be provided, such as centering sleeves, centering pins, or complementary surfaces at the joint. As shown in FIGURE 2, centering is effected by means of a tongue and groove joint 6.

In the construction shown in FIGURE 3, rounded or cylindrical steel bolts 10, 11 are inserted into the rod body 7 and the cap 8 of the light metal connecting rod transversely to the holes 13. Screw-threaded holes 14, 15 respectively are provided at right-angles to the axis of each bolt 10, 11, and coaxially to the hole 13. The stud 9 is in the form of a differential screw and is tightened by means of a key which is inserted in a recess 12 at one end.

The transverse bolts may be of any desired shape and may also be arranged so near the periphery that they lie in a channel in the rod body or the cap respectively. In this case it is preferred to use a semi-circular cross-section.

I claim:
1. In a split connecting rod, a screw threaded connection comprising screw threaded holes in each half of the connecting rod, each hole in each half being aligned with a hole in the other half and having a thread of like hand to that with which it is aligned but of different pitch, and screw threaded studs each having two threads corresponding to those in the aligned holes so that rotation of the studs either draws the two halves together or pulls them apart.

2. In a split connecting rod, a screw threaded connection comprising screw threaded holes in each half of the connecting rod, each hole in each half being aligned with a hole in the other and having a thread of opposite hand to that with which it is aligned, and screw threaded studs each having two threads of opposite hand to correspond to those in the aligned holes into which they screw so that rotation of the stud either draws the two halves together or draws them apart.

3. In a split connecting rod, a screw threaded connection comprising holes in each half of the connecting rod, the holes in each half being aligned with those in the other, bolts in each said half extending at right angles to the holes in such half and passing through them, the bolts themselves having transverse screw threaded holes aligned with the holes in their respective halves of the connecting rod to provide threads by which the halves of the connecting rod are joined, the screw-threaded-holes in the bolts in one half of the connecting rod having threads of pitch different from the threads of the screw-threaded holes in the bolts in the other half of the connecting rod, and differentially connecting rod threaded studs engaging the screw-threaded holes in the bolts in both halves of the connecting rod so as to screw the two halves of the connecting rod together.

4. A split bearing adapted to withstand alternating loads acting in opposite directions transversely to the bearing axis comprising, in combination, a bearing body member; a bearing cap member forming together with the bearing body member a closed bearing, said members being each formed with screw threaded holes extending transverse to the bearing axis and the holes in one of said members being aligned with the holes in the other of said members; the screw-threaded holes in one of said members having threads of a pitch different from the threads of the screw-threaded holes in the other of said members, and differentially-threaded studs respectively screwed into said aligned holes to hold said members together while distributing by means of said threads the stresses created by the loads evenly over both members, thus avoiding stress concentration in one of said members.

5. A connecting rod comprising a body portion and a cap portion, said portions defining together a bearing for engagement about a crankshaft, said portions having aligned holes therein provided with screw threads of unlike pitch, said holes being positioned clear of said bearing, and differential screws engaging said threads to secure said portions together.

6. A connecting rod comprising a body portion and a cap portion, said portions being made of aluminum or aluminum alloy, said portions defining together a bearing for engagement about a crankshaft, said portions having aligned holes therein provided with screw threads of unlike pitch, said holes being positioned clear of said bearing, and differential screws engaging said threads to secure said portions together.

References Cited in the file of this patent

UNITED STATES PATENTS

| | | |
|---|---|---|
| 1,539,826 | Boutelle | June 2, 1925 |
| 1,831,430 | Weis | Nov. 10, 1931 |
| 1,957,654 | La Brie | May 8, 1934 |
| 2,445,396 | Gursky | July 20, 1948 |
| 2,473,096 | Hamill et al. | June 14, 1949 |
| 2,574,318 | Burkhardt | Nov. 6, 1951 |
| 2,703,263 | Zernov | Mar. 1, 1955 |

UNITED STATES PATENT OFFICE
CERTIFICATE OF CORRECTION

Patent No. 2,990,218                                    June 27, 1961

Ernst Schlechtendahl

It is hereby certified that error appears in the above numbered patent requiring correction and that the said Letters Patent should read as corrected below.

Column 3, line 3, strike out "connecting rod".

Signed and sealed this 14th day of November 1961.

(SEAL)
Attest:

ERNEST W. SWIDER                                    DAVID L. LADD
Attesting Officer                                        Commissioner of Patents